United States Patent [19]

Mertens

[11] Patent Number: 4,703,828
[45] Date of Patent: Nov. 3, 1987

[54] DRIVE UNIT SUSPENSION

[75] Inventor: Theobald Mertens, Mainz, Fed. Rep. of Germany

[73] Assignee: General Motors Corporation, Detroit, Mich.

[21] Appl. No.: 850,032

[22] Filed: Apr. 10, 1986

[30] Foreign Application Priority Data

Jul. 30, 1985 [DE] Fed. Rep. of Germany ....... 3527247

[51] Int. Cl.4 .............................................. B60K 5/12
[52] U.S. Cl. .................................. 180/291; 180/312; 248/635
[58] Field of Search ............... 180/291, 292, 298, 299, 180/300, 311, 312; 248/632, 635

[56] References Cited

U.S. PATENT DOCUMENTS

| | | | |
|---|---|---|---|
| 4,266,630 | 5/1987 | Nilsson et al. | 180/291 |
| 4,402,380 | 9/1983 | Strong | 180/312 |
| 4,494,723 | 1/1985 | Kubaki et al. | 180/312 |

Primary Examiner—John J. Love
Assistant Examiner—Richard Camby
Attorney, Agent, or Firm—R. L. Phillips

[57] ABSTRACT

A mounting device is disclosed for mounting a drive unit in a motor vehicle having a pin that is rotationally symmetrical and seats in an elastomeric portion of a damping block so as to be capable of rotation about an axis longitudinal of the drive unit.

2 Claims, 3 Drawing Figures

DRIVE UNIT SUSPENSION

TECHNICAL FIELD

This invention relates to a drive unit suspension for a motor vehicle, including suspension brackets which are fastened to the drive unit, and each provided with a shaft that is in longitudinal alignment with the drive unit and is adapted for insertion into an opening of an elastomeric portion of a respective damping block connected to the body structure.

BACKGROUND OF THE INVENTION

A drive unit suspension of relevant type is disclosed in pending U.S. patent application Ser. No. 771,812, filed Sept. 3, 1985 and assigned to the assignee of this invention.

In this drive unit suspension, the cross-section of the member for insertion into the opening and the opening are of trapezoid configuration, so that relative movement between that member and the elastomeric portion is not possible. Another reason that such relative movement is precluded is that the trapezoid-shaped member is cemented to the elastomeric portion.

In another drive unit suspension, that is in common use, the bracket is connected to the elastomeric portion by means of two threaded bolts that are arranged one above the other. In this arrangement, too, any movement of the bracket causes movement in the elastomeric portion so that the desired damping and isolation will occur.

Since the area where the member and the elastomeric portion are joined is never perfectly even, the acoustic connection between the bracket and the damping block will, of necessity, be acoustically imperfect. In order to raise the acoustic comfort to a satisfactory level, some additional procedures are normally required. The usual procedure is to bridge the U-shaped cross-section of the bracket by a sheet metal member. This sheet metal member is welded to the bracket and serves as a means to provide acoustic reinforcement and stabilization. However, this subsequent procedure is cost-intensive and is not very effective. The latter fix also introduces the potential for errors or inaccuracies.

Apart from these shortcomings, experience under practical operating conditions has been that during periods of acceleration, the elastomeric portion will be, due to the tilting movement of the drive unit, subjected to excessive twisting. As a result, the elastomeric portion may harden and assume a different spring characteristic. This means that its ability to dampen drive unit vibrations is substantially impaired.

SUMMARY OF PRESENT INVENTION

It is an object of the present invention to provide a low-cost, simplified drive unit suspension that achieves optimum vibratory and acoustic comfort under all vehicle operating conditions.

This objective is accomplished by making the member for insertion into the opening of circular cross section and adapting same for free pivoting movement inside of the elastomeric member.

In adapting this novel configuration, the design philosophy was to deliberately abandon the prior art objective of absorbing torsional loads in the damping block and instead allows the drive unit the freedom to tilt longitudinally inside the damping blocks without causing the elastomeric members to be twisted. This eliminates the tendency of the elastomeric members to harden, so that their isolating characteristics, even during periods of vehicle acceleration, are not impaired. As a result, the acoustic comfort of the vehicle is considerably improved, while the costs for the novel damping blocks do not exceed the costs of conventional blocks. Since the vibratory characteristics are not dependent any more on a more or less perfect connection between the shaft and the elastomeric member, the vibratory behavior can now be predicted much more accurately. This obviates the need for subsequent vibratory tuning procedures.

Another advantageous feature incorporated into the invention is that the shaft is mounted for axial displacement in the opening. This obviates the prior art requirement of providing a threaded connection between the support member and the damping block, and in its place a push-in connection can be employed that is less costly to manufacture, reduces assembly times and through which compensation can be made for tolerances in the direction transversely to vehicle travel. This, in turn, eliminates stresses in the elastomeric member and thus precludes changes in the vibratory characteristics.

DESCRIPTION OF PREFERRED EMBODIMENT

These and other objects advantages and features of the present invention will become more apparent from the following description and drawings in which.

Figure 1:
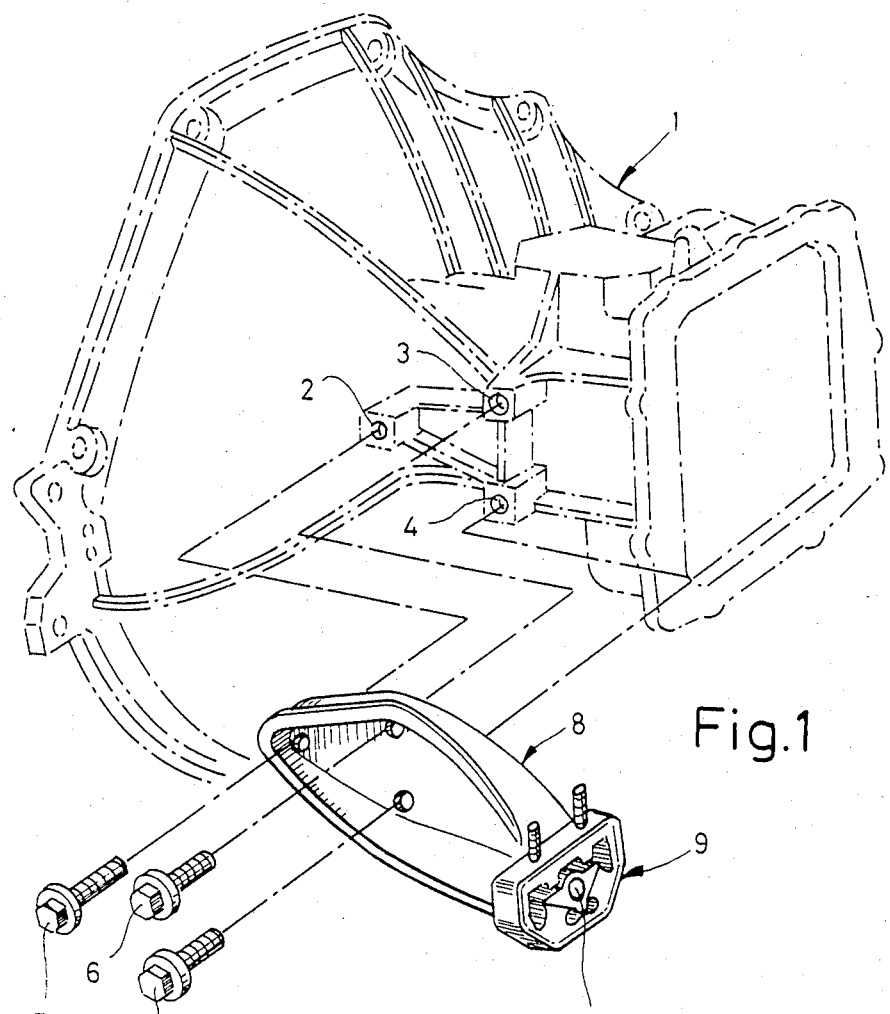
FIG. 1 is a perspective exploded view of a drive unit suspension according to the invention.

FIG. 1 illustrates the transmission end of a motor vehicle drive unit 1 wherein on one side, there are three threaded bores 2, 3 and 4 for receiving three threaded bolts 5, 6 and 8 which serve to fasten the bracket 8 of a mounting device to the drive unit. The bracket serves as a means to connect the drive unit 1 including an engine (not shown) with the vehicle body (also not shown) and as a general rule, three such mounting devices are utilized to support the one drive unit.

Figure 2:
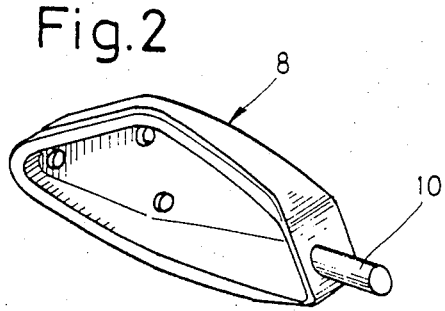
FIG. 2 is a perspective view of a bracket of the drive unit suspension according to the invention.

The essential element of the invention is the configuration of the bracket 8 and a damping block 9 which serves to cushionly connect the bracket to the vehicle body. The bracket 8 is provided with a cylindrical shaft 10 that extends in the longitudinal direction of the drive unit and is adapted for engagement with the damping block 9. The bracket 8 with shaft 10 is illustrated as a unit in FIG. 2.

Figure 3:
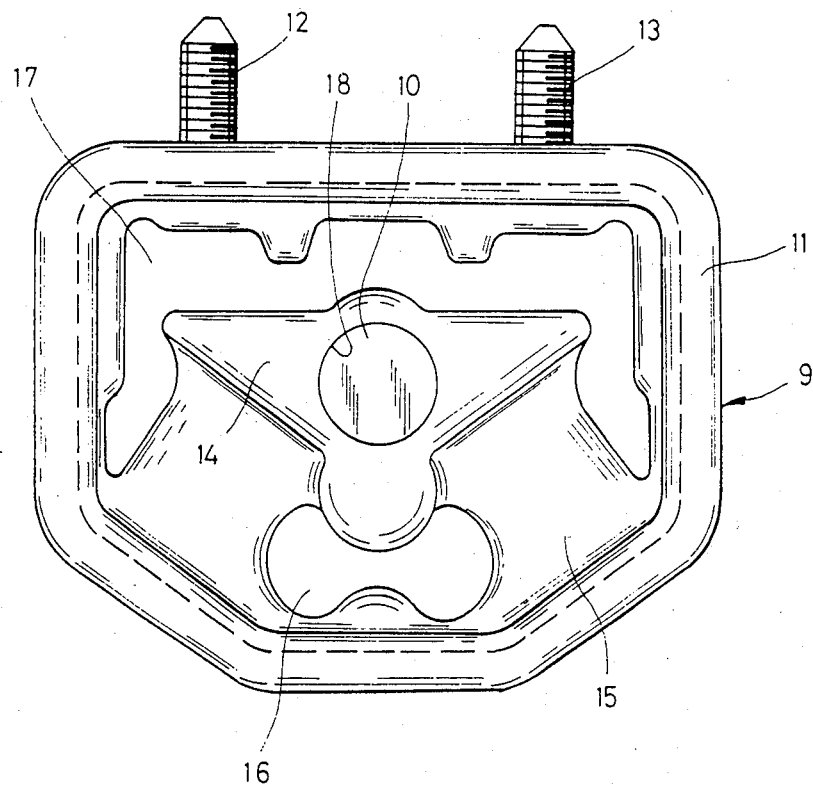
FIG. 3 is a side view of the damping block according to the invention.

The damping block 9 is illustrated in greater detail in FIG. 3. It has an outer portion 11 made of steel that is provided on its upper portion with two threaded studs 12, 13 which serve as a means to fasten the damping block to the vehicle body. Inside of the outer portion there is an inner portion 14 of substantially triangular cross section that is connected with the outer portion 11 through an elastomeric member 15. This elastomeric portion 15 is provided with openings 16, 17 that are fashioned on the basis of well known vibratory related technological considerations. The inner portion 14 is provided with a cylindrical opening 18 into which the cylindrical shaft is freely fitted so that it is free to rotate therein. In addition, the bore 18 may be enlarged and provided with an anti-friction bearing that is adapted to receive the shaft 10. The unit is easily assembled in the damping block 9 by simply being pushed from the side onto the shaft 10.

The above described embodiments are illustrative of the invention which may be modified within the scope of the appended claims.

The embodimens of the invention in which an exclusive property or privilege is claimed are defined as follows:

1. Mounting device for mounting a drive unit in a motor vehicle, comprising a bracket having a pin extending in the longitudinal direction of the drive unit in a recess in an elastomeric portion of a damping block that is connected to the motor vehicle, characterized by the pin being rotationally symmetrical and seated in the recess in the elastomeric portion so as to be capable of free rotation in the elastomeric portion about the longitudinal axis of the pin to prevent twisting of the elastomeric portion due to tilting movement of the drive unit.

2. Mounting device according to claim 1, further characterized by the pin seated so as to also be longitudinally displaceable in the recess to allow push-in assembly of the pin in the elastomeric portion.

* * * * *